US012687893B2

(12) United States Patent
Kim

(10) Patent No.: US 12,687,893 B2
(45) Date of Patent: Jul. 21, 2026

(54) DISPLAY APPARATUS

(71) Applicant: LG Display Co., Ltd., Seoul (KR)

(72) Inventor: Sung-Han Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 68 days.

(21) Appl. No.: 17/987,362

(22) Filed: Nov. 15, 2022

(65) Prior Publication Data

US 2023/0152860 A1     May 18, 2023

(30) Foreign Application Priority Data

Nov. 16, 2021     (KR) ........................ 10-2021-0157400

(51) Int. Cl.
| | |
|---|---|
| *G06F 1/16* | (2006.01) |
| *G02F 1/1333* | (2006.01) |
| *G02F 1/1335* | (2006.01) |
| *G09F 9/33* | (2006.01) |
| *G09F 9/35* | (2006.01) |
| *H04M 1/02* | (2006.01) |

(52) U.S. Cl.
CPC ...... *G06F 1/1658* (2013.01); *G02F 1/133308* (2013.01); *G02F 1/13338* (2013.01); *G02F 1/133509* (2013.01); *G02F 1/133528* (2013.01); *G06F 1/1626* (2013.01); *G06F 1/1637* (2013.01); *G06F 1/1686* (2013.01); *G09F 9/33* (2013.01); *G09F 9/335* (2021.05); *G09F 9/35* (2013.01); *H04M 1/0266* (2013.01); *H04M 1/0264* (2013.01)

(58) Field of Classification Search
CPC .... G06F 1/1658; G06F 1/1686; G06F 1/1626; G06F 1/1637; H04M 1/0264; H04M 1/0266; G02F 1/133308; G02F 1/13338; G02F 1/133509; G02F 1/133528; G09F 9/33; G09F 9/335; G09F 9/35
See application file for complete search history.

(56) References Cited

U.S. PATENT DOCUMENTS

| | | | | |
|---|---|---|---|---|
| 11,106,066 B2 * | 8/2021 | Inoue | ................ | G02F 1/133308 |
| 2016/0188082 A1 * | 6/2016 | Ham | .................... | G02F 1/13338 |
| | | | | 345/173 |
| 2016/0227653 A1 * | 8/2016 | Kim | ...................... | G06F 1/1684 |
| 2018/0081240 A1 * | 3/2018 | Kim | ...................... | G02B 6/0028 |
| 2019/0113796 A1 * | 4/2019 | Jin | ........................ | G02B 6/0053 |
| 2019/0212489 A1 * | 7/2019 | Xu | ........................ | G02F 1/1335 |
| 2020/0183220 A1 * | 6/2020 | Ochi | ................ | G02F 1/133308 |
| 2021/0083227 A1 * | 3/2021 | Her | ...................... | H10K 59/123 |
| 2021/0328177 A1 * | 10/2021 | Wang | .................... | H10K 59/40 |

FOREIGN PATENT DOCUMENTS

| | | |
|---|---|---|
| CN | 211238254 U | 8/2020 |
| CN | 111630831 A | 9/2020 |
| CN | 113314029 A | 8/2021 |

(Continued)

*Primary Examiner* — Brian Handville
(74) *Attorney, Agent, or Firm* — Seed Intellectual Property Law Group LLP

(57) ABSTRACT

A display apparatus includes a display panel having a plurality of sub-pixels, a front member disposed over an upper surface of the display panel, and a first plate disposed under a rear surface of the display panel, the display panel and the first plate including a same plane in a vertical direction of the display panel.

26 Claims, 5 Drawing Sheets

100

(56) References Cited

FOREIGN PATENT DOCUMENTS

| KR | 10-2014-0058724 A | 5/2014 | |
|----|----|----|----|
| KR | 10-2016-0115572 A | 10/2016 | |
| KR | 20190089578 A | 7/2019 | |
| KR | 20210109100 A | 9/2021 | |
| WO | WO-2019147012 A1 * | 8/2019 | ............ H04M 1/026 |
| WO | WO-2021027098 A1 * | 2/2021 | ......... H10K 59/8722 |

* cited by examiner

DISPLAY APPARATUS

CROSS-REFERENCE TO RELATED APPLICATION

This application claims priority to, and the benefit of, Korean Patent Application No. 10-2021-0157400, filed on Nov. 16, 2021, the disclosure of which is incorporated herein by reference in its entirety.

BACKGROUND

Technical Field

The present specification relates to a display apparatus, and more particularly, to the display apparatus that minimizes damage to the display apparatus from an external impact.

Description of the Related Art

A display apparatus used in a computer monitor, a TV, and a mobile phone includes an organic light emitting display apparatus that emit light by itself, and a liquid crystal display apparatus that require a separate light source.

The display apparatus is applied to a personal portable apparatus as well as the computer monitor and the TV, and the display apparatus having a large display area and reduced volume and weight is being studied.

In order to provide a user with more various functions, an optical component such as a camera is provided for the display apparatus. In order to manufacture the optical component such as the camera, the display apparatus in which a part of the display apparatus is cut or a hole is formed in the display apparatus to mount the optical component is being developed.

The display apparatus that is lighter and thinner has a problem in that the display apparatus is damaged when an external impact (e.g., the display apparatus is dropped due to careless handling) is applied to the display apparatus.

Accordingly, although various studies have been made to improve the rigidity of the display apparatus in recent years, it is still insufficient, and development thereof is urgently required.

BRIEF SUMMARY

An object of the present specification is to provide a display apparatus including a first plate having high rigidity to protect and support a display panel.

Other object of the present specification is to provide the display apparatus that minimizes damage to the display apparatus from an external impact applied to the side surface of the display apparatus by improving the rigidity of the side surface of the display apparatus.

Another object of the present specification is to provide the display apparatus capable of improving structural rigidity and stability of an area in which a camera is mounted in the display region.

A display apparatus according to an embodiment of present specification comprises a display panel having a plurality of sub-pixels, a front member disposed over an upper surface of the display panel; and a first plate disposed under a rear surface of the display panel, wherein the display panel and the first plate include a same plane in a vertical direction of the display panel.

The display apparatus according to another embodiment of the present specification further comprises an adhesive layer disposed between the display panel and the front member, a polarizing plate disposed between the adhesive layer and the display panel, and a second plate disposed between the display panel and the first plate, wherein the adhesive layer, the polarizing plate, and the second plate include the same plane as the display panel and the first plate.

The display apparatus according to another embodiment of the present specification comprises a display panel including a display area having a plurality of sub-pixels, wherein a camera area having a first hole is disposed in the display area; a first plate disposed under a rear surface of the display panel, the first plate including a second hole having a step and overlapped with the first hole; and front member disposed at a front of the display pane.

The problems to be solved according to the embodiments of the present specification are not limited to the problems mentioned above, and other problems not mentioned will be clearly understood by those skilled in the art from the following description.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1A:
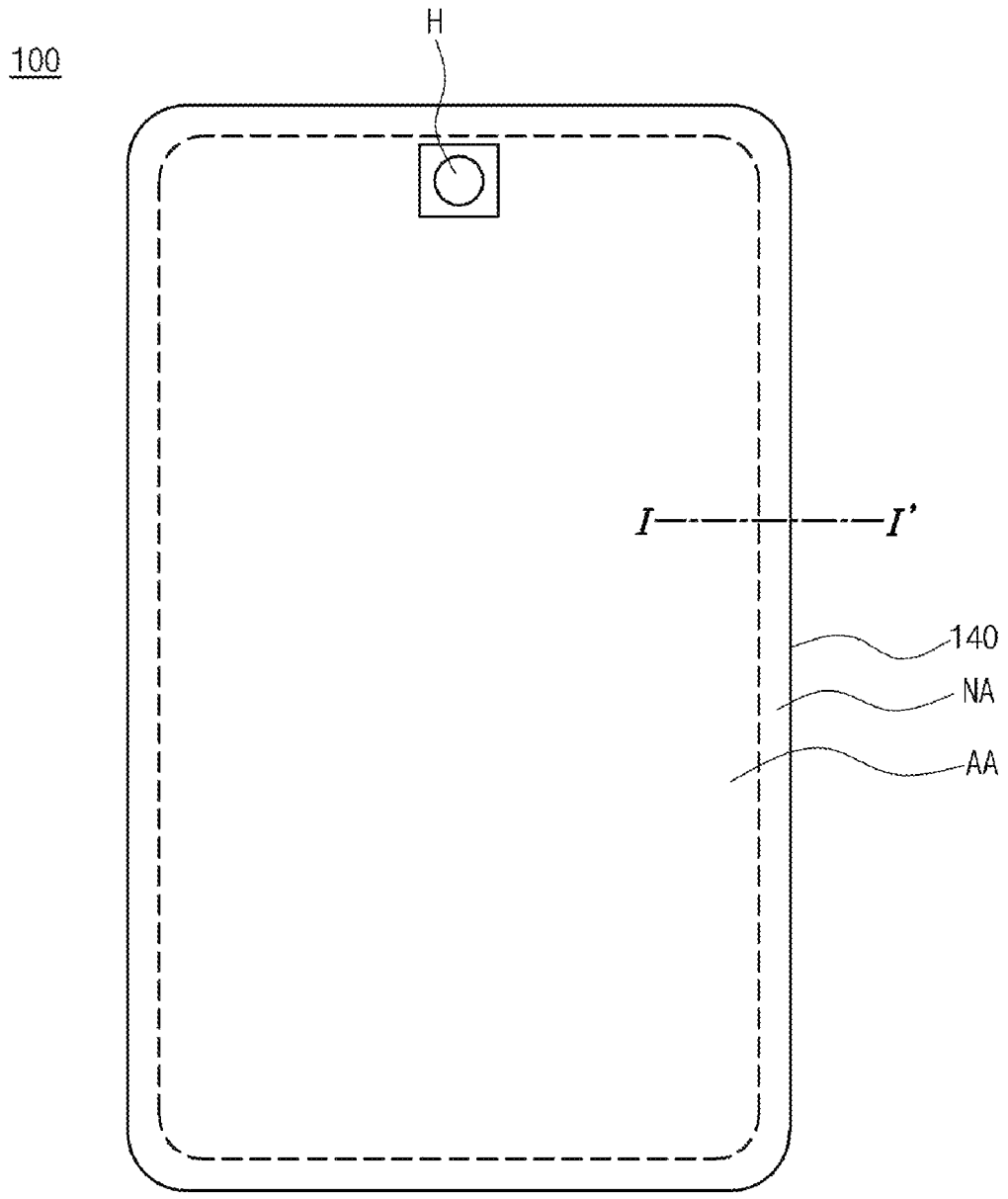
FIG. 1A is a plan view of a display apparatus according to the present specification.

Advantages and features of the present disclosure, and a method for achieving them will become apparent with reference to the embodiments described below in detail in conjunction with the accompanying drawings. However, the present disclosure is not limited to the embodiments disclosed below, but will be implemented in a variety of different forms, and only these embodiments allow the disclosure of the present disclosure to be complete for those of ordinary skill in the art to which the present disclosure pertains. It is provided to inform the person of the scope of the disclosure. The claims are not limited by the disclosure.

Since the shapes, sizes, proportions, angles, numbers, etc., disclosed in the drawings for explaining the embodiments of the present disclosure are exemplary, the present disclosure is not limited to the matters shown in the drawings. Throughout the specification, like elements may be referred to by like reference numerals. In addition, when describing the present disclosure, if it is determined that a detailed description of a related known technology may unnecessarily obscure the subject matter of the present disclosure, the detailed description thereof will be omitted.

When 'including,' 'having,' 'comprising,' etc., mentioned in this specification are used, other parts may be added unless the expression 'only' is used. When a component is expressed in the singular, the plural is included unless specifically stated otherwise.

When interpreting components, it should be interpreted as including a range of errors, even if there is no explicit description.

For example, when the positional relationship of two parts is described as 'on,' 'upper,' 'below,' 'beside,' etc., one or more other parts may be positioned between the two parts, unless the expression 'directly' or 'immediately' is used.

In the case of a description of a temporal relationship, for example, when a temporal relationship is described with 'after,' 'following,' 'subsequent,' 'before,' etc., it may include cases that are not continuous unless the expression 'immediately' or 'directly' is used.

Although the first, second, etc., are used to describe various elements, these elements are not limited by these terms. These terms are only used to distinguish one component from another. Accordingly, the first component mentioned below may be the second component within the spirit of the present disclosure.

In describing the components of the present specification, terms such as first, second, A, B, (a), (b), etc., may be used. These terms are only for distinguishing the elements from other elements, and the essence, order, or number of the elements are not limited by the terms. When it is described that a component is "connected" or "coupled" to another component, the component may be directly connected or coupled to the other component, but indirectly without specifically stated It should be understood that other components may be "interposed" between each component that is connected or can be connected.

The term "at least one" should be understood to include all possible combinations from one or more related items. For example, the meaning of "at least one of the first, second, and third items" means 2 of the first, second, and third items as well as each of the first, second, and third items. It may mean a combination of all items that can be presented from more than one.

As used herein, the term "apparatus" may include a display apparatus such as a liquid crystal module (LCM) including a display panel and a driving unit for driving the display panel, and an organic light emitting display module (OLED module). Further, the term "apparatus" may further include a notebook computer, a television, a computer monitor, a vehicle electric apparatus including an apparatus for a vehicle (automotive apparatus) or other type of vehicle, and a set electronic apparatus or a set apparatus such as a mobile electronic apparatus of a smartphone or an electronic pad, etc., which are a finished product (complete product or final product) including LCM and OLED module.

Accordingly, the apparatus in the present specification may include the display apparatus itself such as the LCM, the OLED module, etc., and the application product including the LCM, the OLED module, or the like, or the set apparatus, which is the apparatus for end users.

In addition, in some embodiments, the LCM or the OLED module composed of a display panel and a driving unit may be expressed as a "display apparatus," and an electronic apparatus as a finished product including the LCM and the OLED module may be distinguished and expressed as a "set apparatus." For example, the display apparatus may include the liquid crystal display (LCD) or the organic light emitting display (OLED) panel, and a source PCB that is a control unit for driving the display panel. The set apparatus may further include a set PCB, which is a set controller electrically connected to the source PCB to drive the entire set apparatus.

All types of display panels such as the liquid crystal display panel, the organic light emitting display panel, and the electroluminescent display panel may be used for the display panel used in the embodiments of the present specification, but not limited thereto. For example, the display panel may be the display panel capable of generating sound by being vibrated by the vibrating device according to the exemplary embodiment of the present specification. The display panel applied to the display apparatus according to the embodiment of the present specification is not limited to the shape or size of the display panel.

Each feature of the various embodiments of the present specification may be partially or wholly combined or combined with each other, technically various interlocking and driving are possible, and each of the embodiments may be independently implemented with respect to each other or may be implemented together in a related relationship.

Hereinafter, an embodiment of the present specification will be described with reference to the accompanying drawings and embodiments. The scales of the components shown in the drawings have different scales from the actual ones for convenience of explanation, and thus are not limited to the scales shown in the drawings.

Hereinafter, various embodiments of the present specification will be described in detail with reference to the accompanying drawings.

Figure 1B:
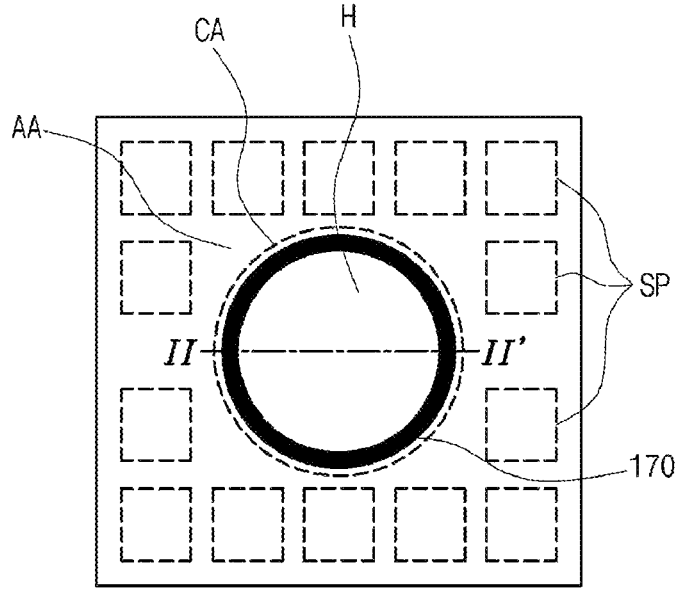
FIG. 1B is an enlarged plan view of the camera area of FIG. 1.
Figure 2:
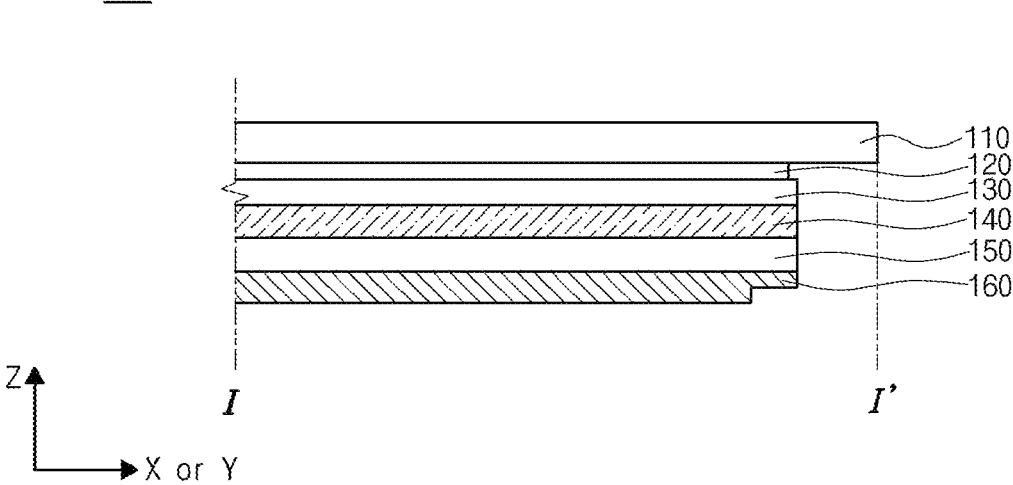
FIG. 2 is a cross-sectional view of the display apparatus according to an exemplary embodiment of the present specification.

FIG. 1A is a plan view of the display apparatus according to the present specification. FIG. 1B is an enlarged plan view of the camera area of FIG. 1. FIG. 2 is a cross sectional view taken along line I-I' shown in FIG. 1A.

Referring to FIGS. 1A, 1B, and 2, the display apparatus 100 according to one embodiment of the present specification includes a front member 110, an adhesive layer 120, a polarizing plate 130, a display panel 140, a second plate 150, and a first plate 160.

The display panel 140 may be a panel on which an image is displayed. For example, the display panel 140 includes a display device for displaying the image and a circuit, a wiring, and components for driving the display device.

Referring to FIGS. 1A and 1B, the display panel 140 includes a display area AA, a non-display area NA, and a camera area CA.

The display area AA is the area in which a plurality of sub-pixels SP are disposed to display the image. Each of the plurality of sub-pixels SP is an individual unit for emitting light. The light emitting device and the driving circuit are formed in each of the plurality of sub-pixels SP. For example, the display device for displaying the image and the circuit unit for driving the display device may be disposed in each of the plurality of sub-pixels SP. For example, when the display apparatus 100 is the organic light emitting display apparatus, the display device may include an organic light emitting device. When the display apparatus 100 is a liquid crystal display apparatus, the display device may include a liquid crystal display device. The plurality of sub-pixels SP may include a red sub-pixel SP, a green sub-pixel SP, a blue sub-pixel SP, and/or a white sub-pixel SP, but is not limited thereto.

The non-display area NA is the area in which the image is not displayed. The non-display area NA is the area in which various wirings, driving ICs, and the like for driving the plurality of sub-pixels SP disposed in the display area AA are disposed. For example, the various ICs such as a gate driver IC and a data driver IC and the driving circuits may be disposed in the non-display area NA. For example, the non-display area NA may be a bezel area, and it is not limited to terminology.

The non-display area NA may be the area surrounding the display area AA as shown in FIG. 1A. The non-display area NA may be the area extending from the display area AA. Further, the non-display area NA may be the area in which the plurality of sub-pixels SP are not disposed. However, the non-display area NA is not limited thereto.

A camera area CA is disposed inside the display area AA. The camera area CA is disposed between the plurality of sub-pixels SP in the display area AA. In the camera area CA, optical components such as a camera and an optical sensor are disposed. The optical sensor may include a proximity sensor, an infrared sensor, an ultraviolet sensor, and the like. A hole H penetrating a part of the display apparatus 100 is formed in the camera area CA to arrange the optical component. By forming the hole H penetrating the display panel 140, a space in which the optical component is disposed may be formed.

Some of the light emitted from the plurality of sub-pixels SP may propagate toward the camera area CA disposed between the plurality of sub-pixels SP, for example, the hole H. When light propagating from the plurality of sub-pixels SP to the hole H is reached to the optical component such as the camera, noise may be generated and thus reliability of the optical component may be deteriorated. Accordingly, the light blocking member 170 may be disposed in the hole H so that light is not reached to the hole H.

The front member 110 is disposed over an upper surface or at a front of the display panel 140. The front member 110 may protect the polarizing plate 130 and the display panel 140 located under the front member 110 from external impact, moisture, heat, and the like. The front member 110 may be made of the material having impact resistance and light transmittance. For example, the front member 110 may be a substrate made of glass or a thin film made of a plastic material such as polymethylmethacrylate (PMMA), polyimide (PI), or polyethylene terephthalate (PET), but is not limited thereto. Further, the front member 110 is an exemplary name, and may be expressed by various names such as a cover window and a cover glass, but is not limited thereto.

The polarizing plate 130 is disposed between the front member 110 and the display panel 140. The polarizing plate 130 selectively transmits light to reduce the reflection of external light incident to the display panel 140. That is, various metal materials applied to the thin film transistors, the wirings, the light emitting device, and the like are disposed in the display panel 140. External light incident to the display panel 140 may be reflected by the metal material, and thus the visibility of the display apparatus 100 may be reduced due to the reflected external light. Since the polarizing plate 130 is disposed on one side of the display panel 140 to prevent reflection of external light, the outdoor visibility of the display apparatus 100 may be improved. However, the position of the polarizing plate 130 illustrated in FIG. 2 is exemplary, and the polarizing plate 130 may be omitted depending on the structure of the display apparatus 100.

The adhesive layer 120 may be disposed between the polarizing plate 130 and the front member 110. For example, the adhesive layer 120 may adhere the front member 110 on the polarizing plate 130. The adhesive layer 120 may be made of the material having adhesive properties. For example, the adhesive layer 120 may be formed of an optical clear adhesive (OCA), a pressure sensitive adhesive (PSA), or the like, but is not limited thereto.

The second plate 150 is disposed under the display panel 140. When the substrate of the display panel 140 is made of the plastic material such as a polyimide, the manufacturing process of the display apparatus 100 is performed while a support substrate made of glass is disposed under the substrate, and the supporting substrate may be separated from the display panel 140 after forming the components such as the polarizing plate on the display panel 140. For example, since the components for supporting the substrate are required even after separation of the supporting substrate, the second plate 150 for supporting the substrate may be disposed under the substrate of the display panel 140. The second plate 150 may support the display panel 140 and protect the display panel 140 from external moisture, heat, impact, and the like. The second plate 150 may be, for example, the thin film made of polyimide (PI), polyethylene terephthalate (PET), polyethylene naphthalate (PEN), or the like. The second plate 150 may be expressed in various terms such as a back plate or an auxiliary plate, but is not limited thereto.

The first plate 160 is disposed under the second plate 150. The first plate 160 may protect and support the components disposed on the first plate 160. Since the first plate 160 is made of a rigid material, it is possible to minimize the occurrence of dent marks and the like due to the external impact. The first plate 160 may be a heat sink member that radiates heat generated when the display apparatus 100 is driven. Further, the first plate 160 may be made of the excellent electrical conductive material, and thus may discharge static electricity generated in the front member 110 together with the light blocking member 170 to the outside. The first plate 160 may be made of the material having excellent thermal and electrical conductivity. For example, the first plate 160 is made of at least one of a copper (Cu), a copper foam (Cu foam), a stainless steel, a graphite, the polyethylene terephthalate (PET), these of an alloy material, and a bonding structure thereof. For example, the first plate 160 may be made of the alloy material of stainless steel and copper, and the like, but is not limited thereto.

Further, the first plate 160 may be expressed in various terms such as a metal plate, but is not limited thereto.

A step is formed at an edge of the first plate 160.

Conventionally, the first plate 160 is made of the rigid material to protect and support the components disposed thereon, such as the front member 110, the display panel 130, and the second plate 150, from external impact. For example, the first plate 160 may be made of metal. But, in this case, the display panel 140 and the first plate 160 cannot be simultaneously cut. When the display panel 140 and the first plate 160 are cut using a laser at the same time, the processing time is prolonged due to the material and thickness of the rigid first plate 160 and the display panel 140 may be damaged due to the strong energy of the laser 200 (see FIG. 3). Accordingly, when the first plate 160 is made of metal, there is the problem in that the display panel 140 and the first plate 160 cannot be cut at the same time. Conventionally, due to this problem, the first plate 160 is attached after cutting the display panel 140. However, when the first plate 160 is attached after cutting the display panel 140, there is the problem in that the edge of the display panel 140 cannot be supported due to a process margin. In order to solve this problem, the inventors of the present specification have studied various methods for simultaneously cutting the display panel and the first plate and reducing damage to the display panel. Through these studies, the display apparatus capable of minimizing damage to the display apparatus from the external impact applied to the side surface of the display apparatus was invented.

Figure 3:
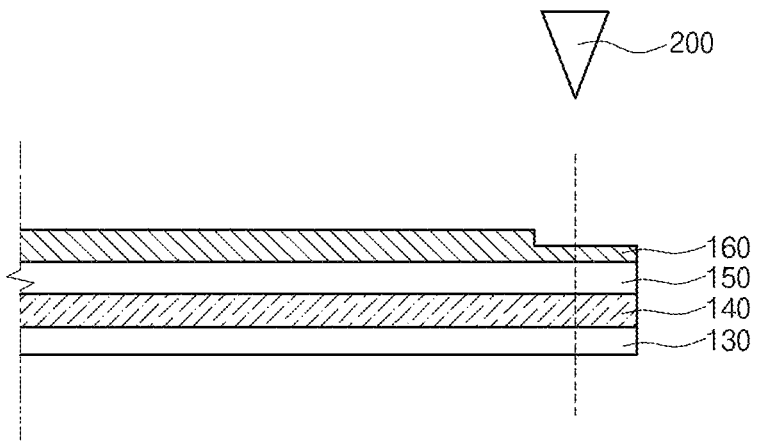
FIG. 3 illustrates a process in which a display panel and a first plate are cut by a laser.

FIG. 3 is the view illustrating the process of cutting the display panel and the first plate by the laser.

Referring to FIGS. 2 and 3, when the display apparatus 100 is fabricated, the polarizing plate 130 is disposed above the display panel 140 and the second plate 150 is disposed under the display panel 140. Thereafter, the first plate 160 having the step at the edge thereof is disposed at the lower side of the second plate 150. Subsequently, the laser beam from the laser 200 is irradiated to the upper surface of the first plate 160 to cut the first plate 160, the second plate 150, the display panel 140, and the polarizing plate 130. Therefore, the cutting faces or side faces of the first plate 160, the second plate 150, the display panel 140, and the polarizing plate 130 are formed in a straight line without the step, a slope, and a curvature. For example, the display panel 140 and the first plate 160 may have a same plane in a vertical direction, meaning that outer peripheral edges or outer surfaces of the display panel 140 and the first plate 160 are aligned along a vertical plane positioned at the outer peripheral edges or outer surfaces. After the cutting process by the laser is terminated, the front member 110 is attached on the polarizing plate 130 by the adhesive layer 120. The display panel 140 and the first plate 160 may be cut in the same process. The display panel 140 and the first plate 160 may include the same plane by the same process.

In accordance with the embodiment of the present specification, since the thickness at the edge of the first plate 160 is small by the step, the display panel 140 and the first plate 160 may be simultaneously cut.

The step of the first plate 160 may be formed by the chemical etching process. For example, a photo-resist pattern is formed on the first plate 160 except the edge and then the edge of the first plate is etched using the photo-resist as an etching mask to partially remove the first plate 160.

Due to the step at the edge, the first plate 160 may have at least two thicknesses. The thickness T1 of the edge may be smaller than the thickness T2 of other area of the first plate 160 by the step (see FIG. 5). The thickness T1 of the edge of the first plate 160 is ½ to ⅓ of the thickness T2 of the first plate 160. For example, when the thickness T2 of the first plate 160 is 90 μm, the thickness T1 of the edge of the first plate 160 may be 30 μm to 45 μm.

The area of the first thickness T1 of the first plate 160 may be overlapped with the non-display area NA of the display panel 140. The area of the second thickness T2 of the first plate 160 may be overlapped with the display area AA and a part of the non-display area NA of the display panel 140.

According to the embodiment of the present specification, the step of the first plate 160 may have a right angle shape.

Figure 4A:
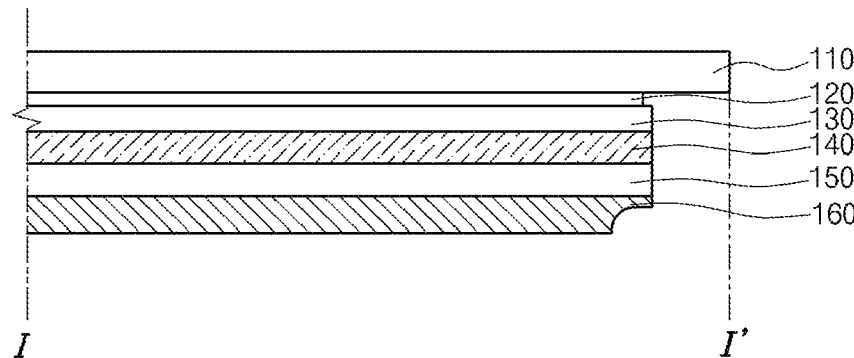
FIGS. 4A and 4B are the cross-sectional views illustrating another structure of FIG. 2.
Figure 4B:
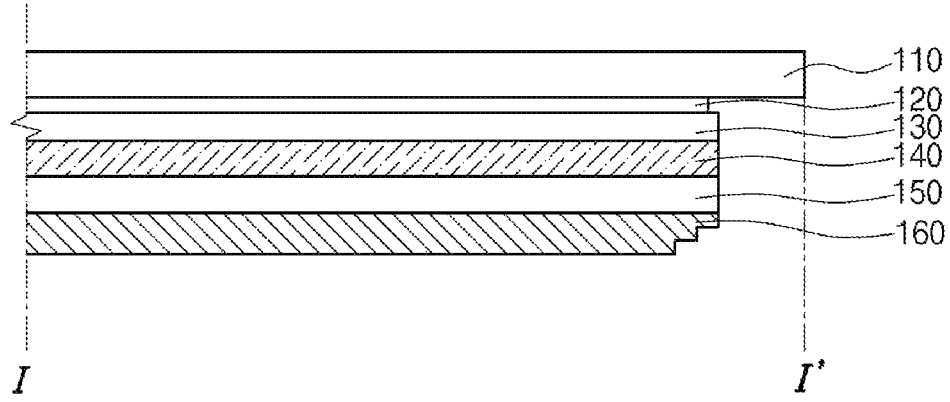

FIGS. 4A and 4B are other cross-sectional views of FIG. 2.

Referring to FIG. 4A, which is other example of the present specification, the step of the first plate 160 may have a curved shape such as a round shape. Referring to FIG. 4B, which is another example of the present specification, the step of the first plate 160 may have a stair shape at a right angle, meaning a step-down or step-up shape with right angles between the steps. For example, the shape of the step may be formed in various shapes such as the right angle, the round shape, and the stair shape by controlling an etching rate.

For example, if the first plate 160 is etched at a high speed, the step is formed in the right-angled shape. If the first plate 160 is etched at a slow speed, the step is formed in the round shape. Further, if additional photoresist patterning process is added, the step may be formed in the stair shape.

Since the first plate 160 supports the lower surface of the display panel 140, the strength of the display panel 140 and the display apparatus can be reinforced. Further, since the edge of the first plate 160 overlaps with the edge of the display panel 140, the strength of the side surface of the display apparatus can be reinforced, and thus the damage to the display panel 140 and the display apparatus caused by the external impact may be minimized.

Hereinafter, another embodiment of the present specification will be described with reference to FIGS. 1B and 5.

FIG. 1B is an enlarged plan view of the camera area within the display area.

Figure 5:
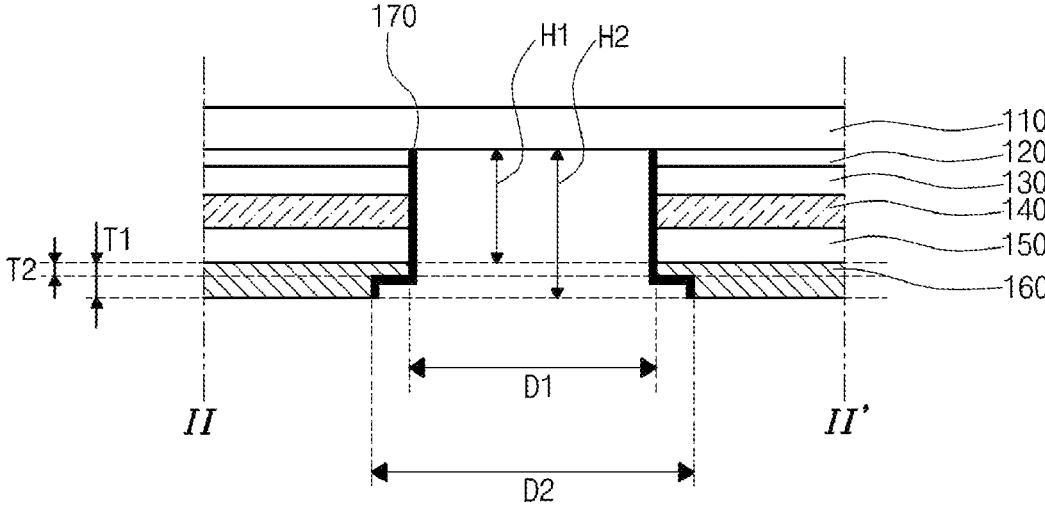
FIG. 5 is the cross-sectional view of the display apparatus according to another embodiment of the present specification in the camera area of FIG. 1B.

FIG. 5 is a cross-sectional view of the display apparatus according to another embodiment of the present specification. FIG. 5 is the cross-sectional view of the camera area CA within the display area AA of the display panel 140 along the line II-II' of FIG. 1B.

Referring to FIG. 5, the display apparatus 100 according to another embodiment of the present specification includes the front member 110, the adhesive layer 120, the polarizing plate 130, the display panel 140, the second plate 150, the first plate 160, and a light shielding member 170.

Comparing the display apparatus of FIG. 5 with the display apparatus of FIG. 2, the structure of the display apparatus of FIG. 5 is substantially same as the structure of the display apparatus of FIG. 2 except the light shielding member 170 disposed in the camera area CA. Thus, duplicated description will be omitted.

A part of the polarizing plate 130, the display panel 140, the second plate 150, and the first plate 160 under the front member 110 may be cut to form the hole H in which the camera and the optical components are disposed. Further, a portion of the display apparatus may be cut in the form of a notch, and various types of regions in which the optical components may be disposed may be formed in the display apparatus.

The hole H is formed in the components of the display apparatus 100 except for the front member 110. The hole H penetrates the adhesive layer 120, the polarizing plate 130, the display panel 140, the second plate 150, and the first plate 160. The hole His an empty space for arranging the optical component such as the camera in the display area AA. The optical component may be disposed in the hole H to recognize the external environment outside the front member 110. Since the hole H is not formed in the front member 110, it is possible to prevent impurities from penetrating into the hole H.

The size of the hole H of the first plate 160 may be determined according to the step structure of the first plate 160. The hole H continuously formed in the adhesive layer 120, the polarizing plate 130, the display panel 140, and the second plate 150 may be a first hole H1. The hole formed in the first plate 160 may be a second hole H2.

For example, referring to FIG. 5, the first hole H1 having a first diameter D1 is formed in the adhesive layer 120, the polarizing plate 130, the display panel 140, and the second plate 150. The step is formed by etching the edge of the first plate 160 within the second hole H2. The portion in which the first plate 160 is not etched may be a first portion. The portion etched by the etching process in the edge of the first plate 160 may be a second portion.

The second hole H2 of the first plate 160 may overlapped with the first hole H1 formed in the adhesive layer 120, the polarizing plate 130, the display panel 140, and the second plate 15. The first portion of the second hole H2 of the first plate 160 may be overlapped with the first hole H1 formed in the adhesive layer 120, the polarizing plate 130, the display panel 140, and the second plate 150.

The cut face of the first plate 160, the second plate 150, the display panel 140, and the polarizing plate 130 disposed in the camera area CA of the display area AA is formed in the straight line without the step, the slope, or a curvature. For example, the display panel 140 and the first plate 160 may have the same face in the vertical direction of the display panel 140.

Due to the step at the edge, the first plate 160 of the camera area CA may have at least two thicknesses. Since the step is formed at the edge of the first plate 160 by etching the edge of the first plate 160, the thickness T1 of the edge of the first plate 160 is smaller the thickness T2 of the first plate 160. The thickness T1 of the edge of the first plate 160 is ½ to ⅓ of the thickness T2 of the first plate 160. For example, when the thickness T2 of the first plate 160 is 90 μm, the thickness T1 of the edge of the first plate 160 may be 30 μm to 45 μm.

The diameter D1 of the first portion of the second hole H2 of the first plate 160 may have the same diameter as the first hole H1 of the first plate 160. The diameter D2 of the second portion may be larger than the diameter D1 of the first portion of the first plate 160.

The area of the first thickness T1 of the first plate 160, which is disposed in the cameral area CA, may be overlapped with the non-display area NA of the display panel 140. The area of the first thickness T1 of the first plate 160 may be overlapped with the non-display area NA of the display panel 140. The area of the second thickness T2 of the first plate 160 may be overlapped with the display area AA and a part of the non-display area NA of the display panel 140.

The step of the first plate 160 formed in the camera area CA has the right-angled shape.

Figure 6A:
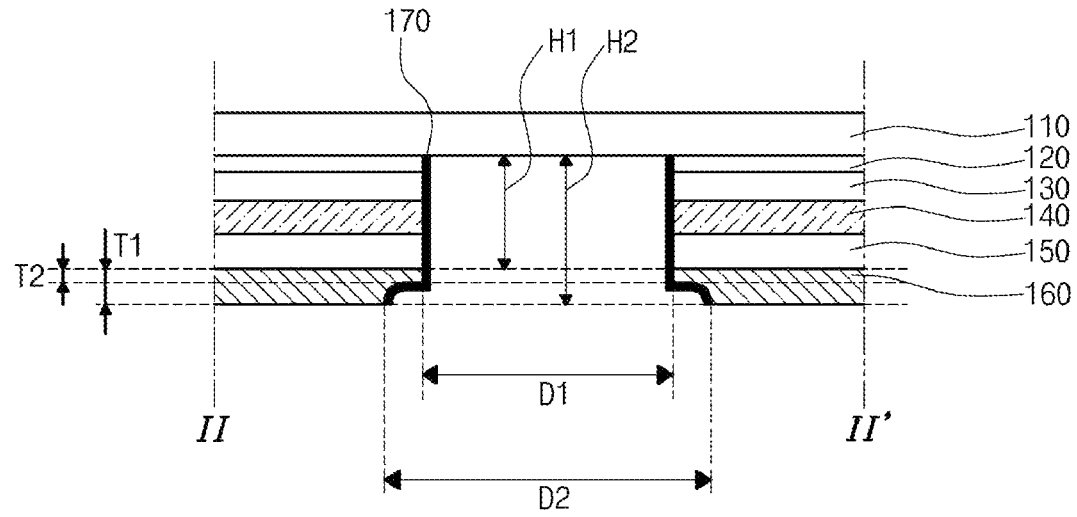
FIGS. 6A and 6B are views according to another embodiment of the present specification, and are cross-sectional views taken along line II-II' of FIG. 1B.
Figure 6B:
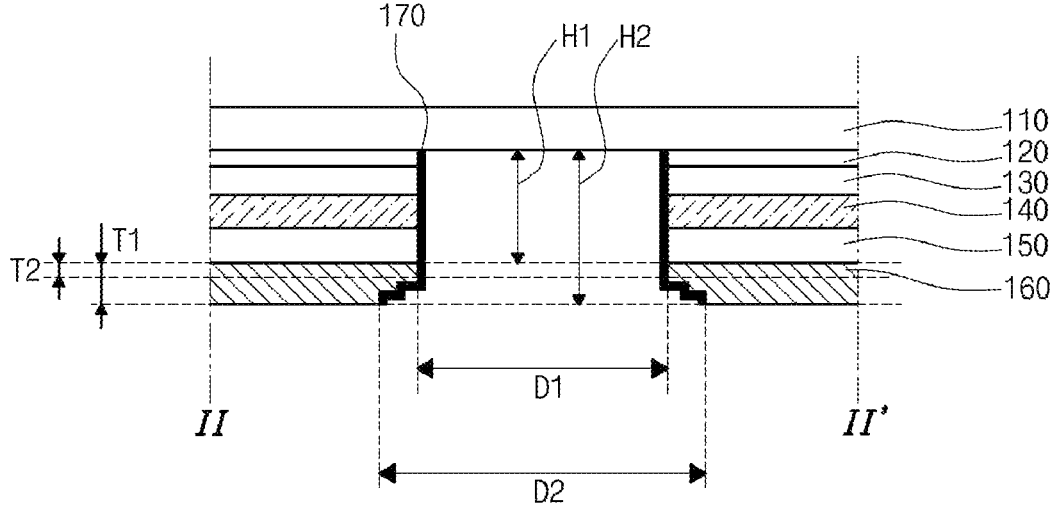

FIGS. 6A and 6B are views according to another embodiment of the present specification, and are cross-sectional views taken along line II-II' of FIG. 1B.

Referring to FIG. 6A, the step of the first plate 160 may be formed in the round shape. Referring to FIG. 6B, the step of the first plate 160 may be formed in the stair shape of the right angle. For example, the shape of the step may be formed in at least one of the right angle, the round shape, and the stair shape by controlling an etching rate.

For example, if the first plate 160 is etched at a high speed, the step is formed in the right-angled shape. If the first plate 160 is etched at a slow speed, the step is formed in the round shape. Further, if additional photoresist patterning process is added, the step may be formed in the stair shape.

Therefore, since the first plate 160 can support the display panel 140 within the camera area CA, the strength of the display panel 140 and the display apparatus is reinforced. Further, since the edge of the first plate 160 is overlapped with the edge of the display panel 140, the strength of the side of the display apparatus 100 is reinforced, it is possible to minimize damage to the display panel 140 and the display apparatus 100 from the impact generated during the subsequent process of mounting the camera inside the hole H or the external impact applied to the display apparatus 100.

The light blocking member 170 is disposed within the hole H. The light blocking member 170 may be made of the conductive material. The light blocking member 170 may discharge static electricity and may prevent light leakage. The light blocking member may be made of an opaque and electrically conductive material.

The light blocking member 170 may block light from the display panel 140 from entering the hole H and discharge static electricity generated from the front member 110.

The light blocking member 170 may cover at least one of a portion of the front member 110, the side surface of the adhesive layer 120, the side surface of the polarizing plate 150, the side surface of the display panel 140, the side surface of the second plate 150, and the side surface of the first plate 160, which are exposed in the hole H. The light blocking member 170 may cover inner side surfaces of the first hole H1 and the second hole H2. For example, the light blocking member 170 may be disposed to cover a portion of the rear surface of the front member 110 in the hole H. For example, one end (or a portion) of the light blocking member 170 may be disposed on the rear surface of the front member 110 and the other end (or other portion) may be overlapped with a portion of the first plate 160.

As another example of the present specification, the light blocking member 170 may cover only the side surface of the first plate 160 and may not cover the rear surface of the first plate 160.

The light blocking member 170 may be made of conductive ink or conductive paste. For example, the conductive paste may include conductive particles such as carbon black, conductive ink mixed with conductive polymers such as PEDOT:PSS (poly(3,4-ethylenedioxythiophene)), or a material such as silver (Ag). For example, the light blocking member 170 may have a resistance of 0 to 106Ω to discharge static electricity. The light blocking member 170 may be formed of various materials other than the above-described materials, but is not limited thereto.

The light blocking member 170 may be formed using a process such as pneumatic spray coating or electrostatic spray coating. The pneumatic spray coating is the method in which the material inside the syringe is pushed and sprayed using air pressure. The electrostatic spray coating is the method of supplying the voltage to the material to apply the electric charge thereto, and then spraying the charged material using a spray nozzle. When the light blocking member 170 is formed by the pneumatic spray coating or the electrostatic spray coating, the viscosity of the light blocking member 170 may be about 10,000 cps or less, but is not limited thereto. The light blocking member 170 may be formed in various other ways, but is not limited thereto.

A display apparatus according to the embodiment of the present specification may be described as follows.

The display apparatus according to the embodiment of the present specification may include the display panel having a plurality of sub-pixels, the front member disposed over the upper surface of the display panel, the first plate disposed under the rear surface of the display panel, wherein the display panel and the first plate include a same plane in the vertical direction of the display panel.

According to some embodiments of the present specification, the step is formed in the edge of the first plate.

According to some embodiments of the present specification, the thickness of the first plate includes at least two thicknesses.

According to some embodiments of the present specification, the smaller of the at least two thickness is formed at the edge of the first plate.

According to some embodiments of the present specification, the step of the first plate is formed in the right angle shape.

According to some embodiments of the present specification, the step of the first plate is formed in the curvature shape.

According to some embodiments of the present specification, the step of the first plate is formed in the stair shape of the right angle.

According to some embodiments of the present specification, the first plate is made of at least one of copper (Cu), copper foam (Cu foam), stainless steel, graphite, polyethylene terephthalate (PET), the alloy material thereof, and the junction structures thereof.

According to some embodiments of the present specification, the display apparatus further includes an adhesive layer disposed between the display panel and the front member, a polarizing plate disposed between the adhesive layer and the display panel, and a second plate disposed between the display panel and the first plate, wherein the adhesive layer, the polarizing plate, and the second plate include the same plane as the display panel and the first plate.

According to some embodiments of the present specification, the display panel and the first plate are cut in the same process.

According to some embodiments of the present specification, the display panel and the first plate include the same plane by the same process.

According to some embodiments of the present specification, a display apparatus includes a display panel including a display area having a plurality of sub-pixels, wherein a camera area having a first hole is disposed in the display area, a first plate disposed under the rear surface of the display panel, and including a second hole having a step and overlapped with the first hole, and a front member disposed at the front of the display panel.

According to some embodiments of the present specification, the display apparatus further includes the light blocking member covering inner side surfaces of the first hole and the second hole.

According to some embodiments of the present specification, the second hole includes a first portion and second portion, the diameter of the first portion is equal to the diameter of the first hole, and the diameter of the second portion is larger than the diameter of the first hole.

According to some embodiments of the present specification, the step of the first plate includes the right angle shape.

According to some embodiments of the present specification, the step of the first plate includes the curvature shape.

According to some embodiments of the present specification, the step of the first plate includes the stair shape of the right angle.

According to some embodiments of the present specification, the thickness of the first plate includes at least two thicknesses.

According to some embodiments of the present specification, the display panel and the first plate include the same plane in the vertical direction of the display panel.

According to some embodiments of the present specification, the display panel and the first plate include the same plane by the same process.

Although the embodiments of the present specification have been described in more detail with reference to the accompanying drawings, the present specification is not necessarily limited to these embodiments, and various modifications may be made within the scope without departing from the technical spirit of the present specification. Accordingly, the embodiments disclosed in the present specification are for explanation rather than limiting the technical spirit of the present specification, and the scope of the technical spirit of the present specification is not limited by these embodiments. Therefore, it should be understood that the embodiments described above are illustrative in all respects and not restrictive. The claims are not limited by the present specification, and all technical ideas within the scope equivalent thereto should be construed as being included in the scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:
a display panel having a substrate, the substrate including a plurality of sub-pixels, the display panel including a thin film transistor and a light emitting device disposed in each sub-pixel of the substrate;
a cover window disposed on an upper surface of the display panel; and
a first plate disposed on a rear surface of the display panel,
wherein the display panel has an end face corresponding to an outermost boundary of the display panel and the first plate has an end face corresponding to an outermost boundary of the first plate, and the end face of the display panel and the end face of the first plate are arranged along a same plane in a vertical direction of the display panel,
wherein the first plate includes a step in an outermost edge of the first plate recessed toward a center of the first plate from the end face of the first plate, and
wherein the first plate is metal.

2. The display apparatus of claim 1, wherein the first plate has a first thickness and a second thickness that is different from the first thickness.

3. The display apparatus of claim 2, wherein the first thickness is less than the second thickness, and the first thickness is at the edge of the first plate.

4. The display apparatus of claim 1, wherein the step of the first plate has a right angle shape.

5. The display apparatus of claim 1, wherein the step of the first plate has a curved shape.

6. The display apparatus of claim 1, wherein the step of the first plate has a step down shape with a right angle between steps of the step down shape.

7. The display apparatus of claim 1, wherein the metal of the first plate includes at least one of: copper, copper foam, stainless steel, an alloy material thereof, and junction structures thereof.

8. The display apparatus of claim 1, further comprising:

an adhesive layer disposed between the display panel and the cover window;

a polarizing plate disposed between the adhesive layer and the display panel; and a second plate disposed between the display panel and the first plate, wherein the second plate is a thin film comprising at least one of: polyimide (PI), polyethylene terephthalate (PET), and polyethylene naphthalate (PEN), and wherein the adhesive layer, the polarizing plate, and the second plate are arranged along the same plane as the display panel and the first plate.

9. The display panel of claim 1, wherein the end face of the display panel and the end face of the first plate are recessed with respect to an end face of the cover window.

10. The display apparatus of claim 1, wherein the step corresponds to a portion of the first plate with a reduced thickness at the same plane.

11. The display apparatus of claim 1, wherein the step of the first plate is one of at least two steps at the outermost edge of the first plate.

12. The display apparatus of claim 1, wherein the outermost edge of the first plate overlaps an outermost edge of the display panel.

13. A display apparatus comprising:

a multi-layer stack, including:

a display panel including a substrate, the substrate including a display area having a plurality of subpixels, wherein the display area includes a camera area having a first hole, the display panel including a thin film transistor and a light emitting device disposed in each sub-pixel;

a first plate disposed under a rear surface of the display panel, the first plate including a second hole and a step around the second hole, the second hole overlapping the first hole;

a cover window disposed on a front surface of the display panel;

an adhesive layer between the display panel and the cover window;

a polarizing plate between the adhesive layer and the display panel;

a second plate under the display panel; and a light blocking member on inner side surfaces of the first hole and the second hole, wherein the light blocking member has a further step corresponding to the step at an edge of the first plate, wherein the multi-layer stack includes the cover window, the adhesive layer, the polarizing plate, the display panel, the second plate, and the first plate in successive order from a top to a bottom of the multi-layer stack.

14. The display apparatus of claim 13, wherein the second hole includes a first portion and a second portion, a diameter of the first portion of the second hole being equal to a diameter of the first hole, and a diameter of the second portion of the second hole being greater than the diameter of the first hole, wherein the first plate is a metal plate and the second plate is a thin film comprising at least one of: polyimide (PI), polyethylene terephthalate (PET), and polyethylene naphthalate (PEN).

15. The display apparatus of claim 13, wherein the step of the first plate has a right angle shape.

16. The display apparatus of claim 13, wherein the step of the first plate has a curved shape.

17. The display apparatus of claim 13, wherein the step of the first plate has a stair shape with a right angle.

18. The display apparatus of claim 13, wherein the first plate includes at least two different thicknesses.

19. The display apparatus of claim 13, wherein the display panel and the first plate include a same plane in a vertical direction of the display panel.

20. The display apparatus of claim 19, wherein the display panel and the first plate include side surfaces arranged along the same plane.

21. The display apparatus of claim 20, wherein the step in the first plate is along the same plane.

22. The display apparatus of claim 21, wherein a thickness of the edge of the first plate is less than a thickness of a remaining area of the first plate.

23. The display apparatus of claim 22, wherein the display panel further includes a non-display area surrounding the display area, and wherein the edge of the first plate overlaps the non-display area, and the remaining area of the first plate overlaps the display area and a part of the non-display area.

24. The display apparatus of claim 13, wherein the step of the first plate is a round shape.

25. The display apparatus of claim 13, wherein the edge of the first plate overlaps an edge of the display panel.

26. The display apparatus of claim 1, wherein the step is directed towards an inside of the display panel so that a thickness of the first plate and the display panel at the step is less than a thickness of the first plate and the display panel in a remaining region of the first plate and the display panel.

* * * * *